United States Patent [19]

Pasquier

[11] 4,050,169
[45] Sept. 27, 1977

[54] SNOW DISTRIBUTION SYSTEM

[75] Inventor: Armand René Pasquier, Annecy, France

[73] Assignee: Etudes Techniques et Realisations (E.T.R.), Douai, France

[21] Appl. No.: 626,638

[22] Filed: Oct. 29, 1975

[30] Foreign Application Priority Data

Oct. 30, 1974 France .............................. 74.36222
Oct. 10, 1975 France .............................. 75.31099

[51] Int. Cl.² .............................................. F25C 3/04
[52] U.S. Cl. ...................................... 37/1; 37/43 R; 62/59; 62/69; 239/2 S
[58] Field of Search .......... 37/1, 42 R, 42 VL, 43 R, 37/43 D, 43 E, 10; 198/2 B, 668; 239/2 R, 2 S, 14, 587; 62/59, 69

[56] References Cited

U.S. PATENT DOCUMENTS

| 1,514,248 | 11/1924 | Bergman | 37/42 R |
|---|---|---|---|
| 1,716,317 | 6/1929 | Lowy | 37/10 X |
| 2,078,310 | 4/1937 | Berres | 37/42 R |
| 2,606,645 | 8/1952 | Heine | 198/213 X |
| 2,676,471 | 4/1954 | Pierce, Jr. | 62/172 |
| 2,789,804 | 4/1957 | Toulmin, Jr. | 37/43 R |
| 2,816,804 | 12/1957 | Harrer | 198/213 X |
| 3,151,749 | 10/1964 | Long | 198/213 X |
| 3,360,108 | 12/1967 | Voss | 198/213 |
| 3,761,020 | 9/1973 | Tropeano | 239/2 S |
| 3,766,586 | 10/1973 | Krickovich | 37/43 E |
| 3,911,601 | 10/1975 | Maheu | 37/42 VL |
| 3,913,247 | 10/1975 | Ruhl | 37/43 E |
| 3,979,061 | 9/1976 | Kircher | 239/2 S |

FOREIGN PATENT DOCUMENTS

| 1,055,652 | 10/1953 | France | 198/668 |
|---|---|---|---|
| 1,004,210 | 9/1965 | United Kingdom | 198/213 |
| 135,502 | 7/1960 | U.S.S.R. | 37/43 E |

Primary Examiner—E. H. Eickholt

[57] ABSTRACT

The invention relates to a method for handling snow and a device for carrying out same, in which the snow is drawn from a systematically exploited heap into the inlet in a pneumatic conveying line, to which a spraying line is connected.

10 Claims, 16 Drawing Figures

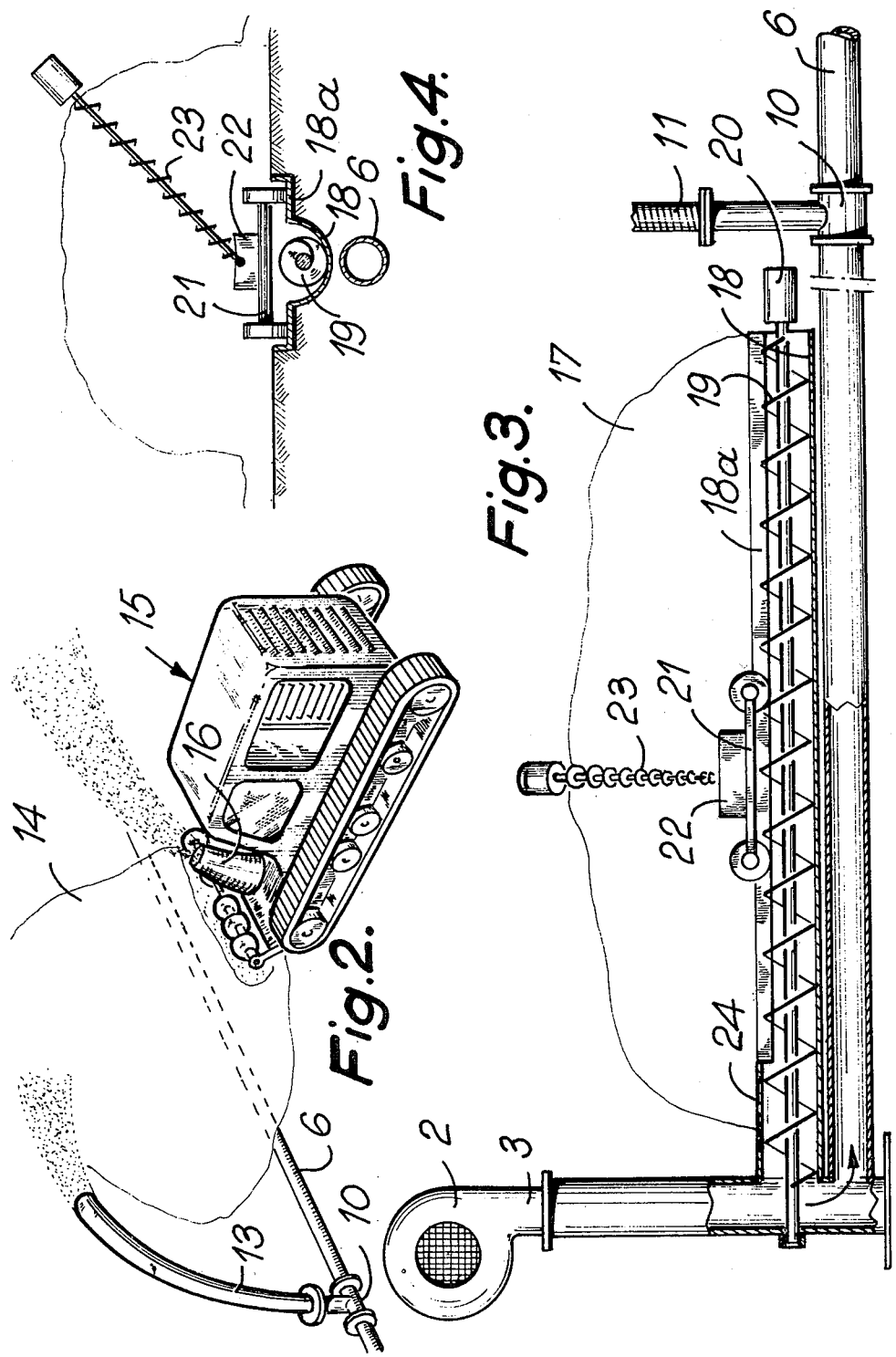

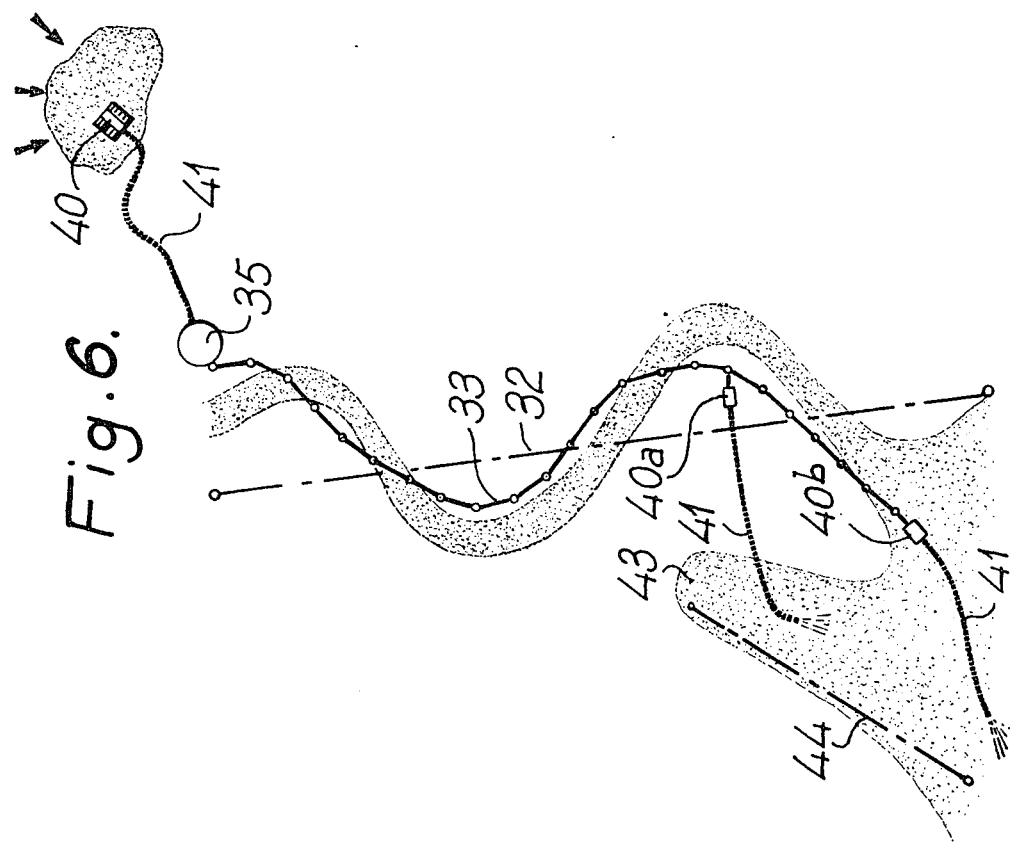
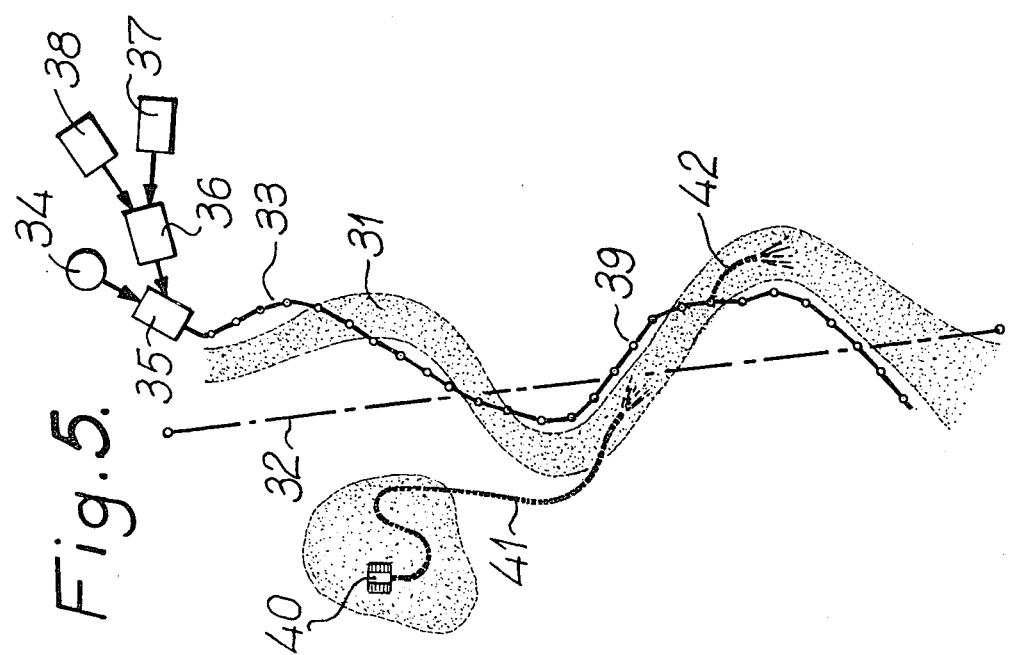

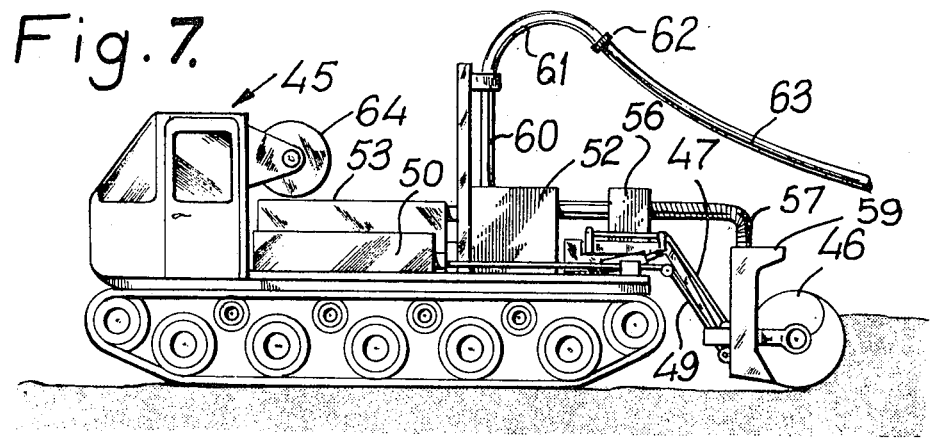
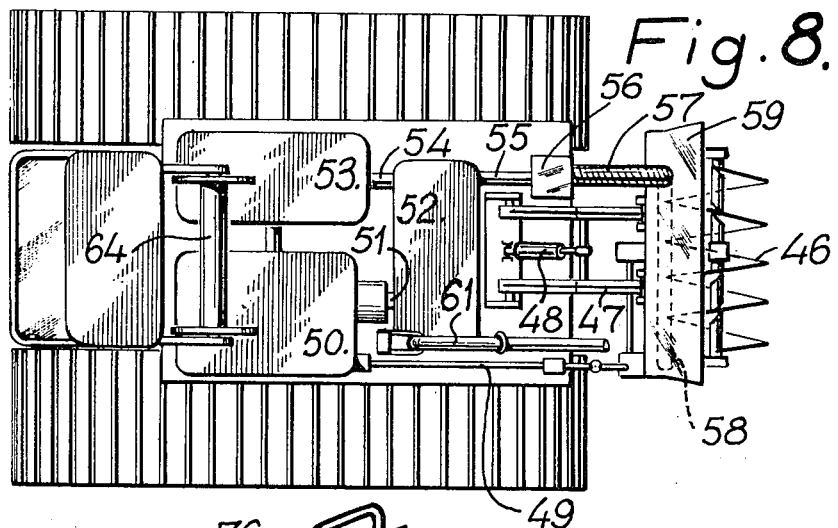
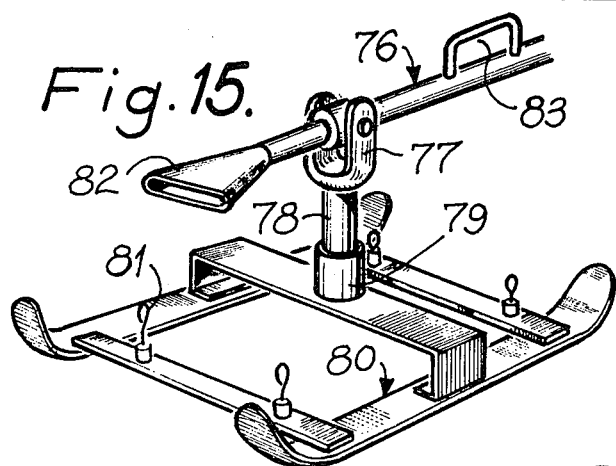

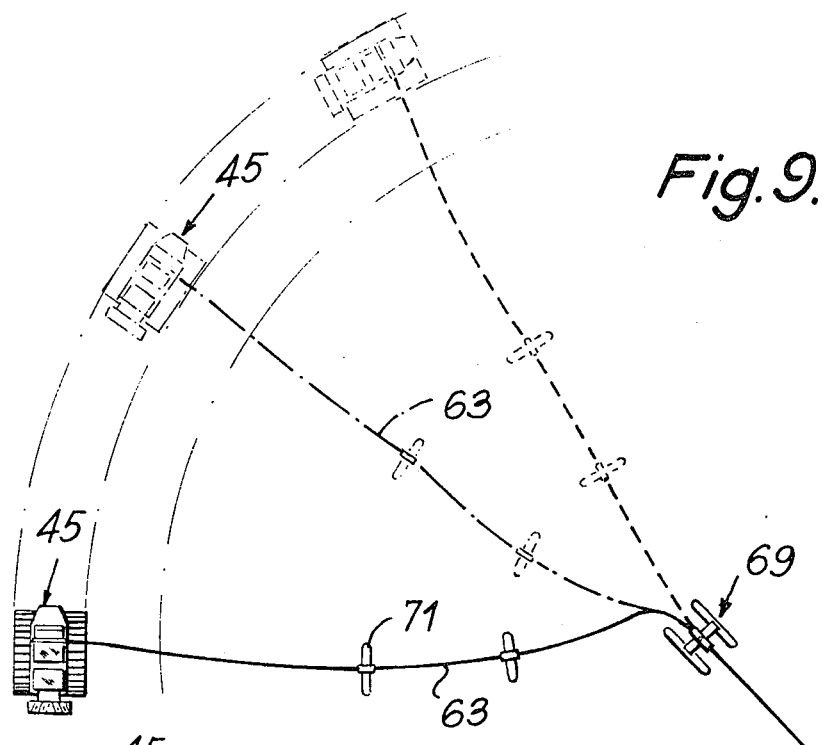
Fig. 9.
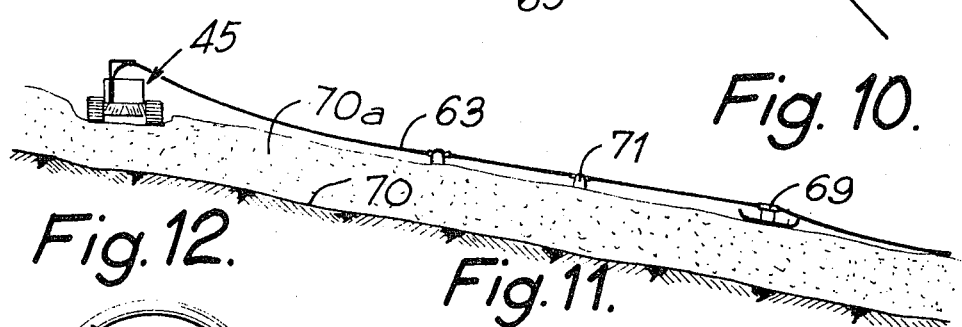
Fig. 10.
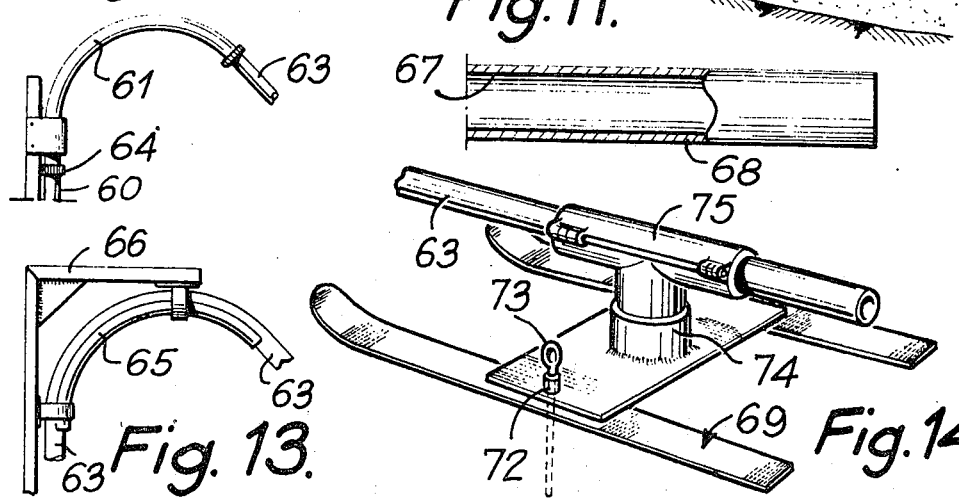
Fig. 11.
Fig. 12.
Fig. 13.
Fig. 14.

SNOW DISTRIBUTION SYSTEM

The technical province of the invention is the handling of powdery materials.

The maintenance of ski runs often requires, especially towards the end of the winter season, that snow be brought to locations where the amount is inadequate. Various techniques have been resorted to, besides maintenance by hand. One of these makes use of desnowing units with adapted caterpillar assemblies, derived from those used on road runs. A cutter or screw gathers the snow, and a turbine and blast pipe assembly makes it possible to spray the snow onto the required area. An artificial-snow generating unit has also been used; it is then carried on wheeled units to the required locations, and the snow is spread by hand or mechanically over the runs to be restored. Such powerful means give better results than hand maintenance. However, their capacity is limited, and conveying costs are high.

This invention aims at remedying such drawbacks. Its object is therefore a method for pneumatic conveying of snow between a storage point and a point of use, by means of lines, collecting assemblies and spraying assemblies.

Different variations are contemplated: with accumulation of natural or artificial snow at a storage point, distribution to one or several accumulating points, direct spraying from the conveying unit or relayed spraying from an accumulating point.

The invention also includes the equipment for carrying out the method, which involves at least one assembly including a conveying line, the inlet of which is provided with a highspeed air generator giving adequate pressure (such as a fan, a blower, a booster, a compressor or other), a device for introducing the snow into the said line, and at least one distributing outlet for the conveyed snow.

This makes it possible to set up a system of lines or even a network which can convey and lay any amount of snow on any location, with remarkably low investments and working costs.

In order to improve the conditions of application of such a method and such equipment and make them more versatile, as also in order to extend the areas on which the snow may be collected and the areas on which the conveyed snow may be distributed, the following measures may be taken.

According to a first improvement, handling of snow is made easier by associating pneumatic propulsion with propulsion by use of the field of gravity.

The equipment may include a mobile unit with a motor, a collecting device, an injector, an air generator and at least one conveying line element, preferably a hose. A sorting device may be associated, preferably at collecting level.

Such mobile units may be used independently from a fixed plant with a conveying line above ground, underground or overhead, or jointly with such a fixed plant, as a feeding relay and/or a spraying relay.

In such mobile equipment, some elements of the associated line may of course be supported by at least one intermediate sledge and suspended above the carrying vehicle, while a swivel anchoring is provided in the intermediate zone, and a monitor-type hinged anchoring is provided for the snow-blowing outlet.

Generally speaking, the lines are provided with an inner wall which reduces the friction of the snow while it is conveyed. The conveying jacket may then be entirly made of a single material, such as synthetic plastic, or internally lined with such material.

The above-mentioned anchorings, allowing for the terrain, are preferably mounted on skids so as to form sledges, in which passages are provided for anchor pins.

The vehicle included in the mobile equipment can be automotive, thus being a kind of full-track carrier, with a collecting cutter at the back, which can be moved up and down. The cutter lies next to the snow collector, which is connected, through a twig and stone remover, to an injecting device or introducing lock, leading to a blowing duct which is connected to an appropriate air generator.

Such a vehicle may also be towed by an ordinary track car.

Thus are provided an improved method and equipment with wider scope, both as to collecting from snow stores and as to greater possibilities of maintaining ski runs, and with lower working costs.

The following description, together with the appended drawings (as non-restrictive examples), shall make the practice of the invention more readily understood.

FIG. 2 shows a first variation.

FIG. 3 shows a section of a variation of the snow storage station for collecting and conveying.

FIG. 4 shows a transverse sectional diagram across the conveying screw of the installation shown in FIG. 1.

FIG. 5 shows a very simplified diagram of the combination of a fixed plant and a mobile equipment for the maintenance of the snow cover of a ski run.

FIG. 6 shows a variation of such a combination.

FIG. 7 shows a profile diagram of a full-track carrier included in the corresponding mobile equipment.

FIG. 8 is a view from above corresponding to FIG. 7.

FIG. 9 shows a diagram of the use of such a full-track carrier for collecting snow.

FIG. 10 shows a profile corresponding to FIG. 5.

FIG. 11 shows a length of conveying line with inside lining, with the jacket partly removed.

FIGS. 12 and 13 show two variations of the fastening of hoses onto a full-track carrier.

FIG. 14 shows a perspective of a sledge with a swivel for the conveying hose.

FIG. 15 shows a sledge supporting a blowing monitor.

FIG. 16 shows a sledge for moving a hose on the terrain.

Figure 1:
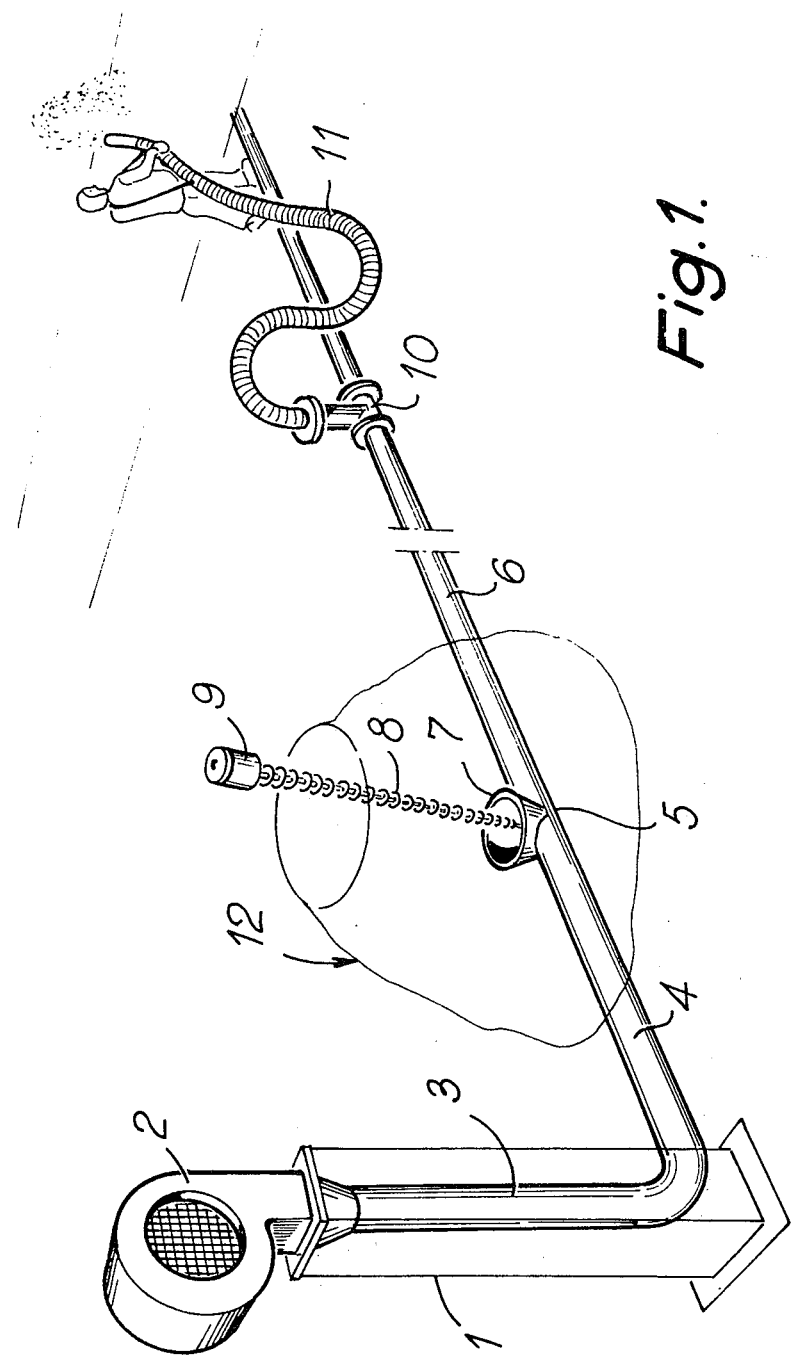
FIG. 1 shows a perspecitve diagram of such a handling installation.

As shown on FIG. 1, a column 1 of adequate height is provided for handling the snow, at the head of which is a driven fan 2 blowing into a bent line 3, which is continued at ground level by a feeding tube 4 leading to a snow injector 5. This injector, thanks to its appropriate profile, introduces snow into the air flow, without the latter blowing back, and the flow then carries the snow into a remote distribution line 6.

Injector 5 is topped by a hopper 7, in the centre of which is mounted with oscillation, but without rotation, the supporting swivel of feeding screw 8, drawn by motor 9.

At appropriate locations along line 6 are provided tees 10, the flanges of which are fitted with closers (not shown) which make it possible to stop the flow into the side line when distribution is not wanted, or the downstream flow if distribution is required beyond the tee.

Such closers may be reversible or sliding plates with a solid area and an opening, as well known. Any other device: sliding valve, butterfly valve or other such, may be contemplated. The tee has a snap fastening device to a distributing hose 11, at the disposal of the maintenance personnel, which can thus spray snow onto bare patches.

The servicing of such a plant consists in providing a snow heap 12 above hopper 7 and in starting fan 2 and screw 8, then in feeding hopper 7 through conical oscillation of screw 8 round its fulcrum, so as to feed line 6 and the appropriate hose 10 regularly. The snow heap 12 may result from adduction from an adjoining layer by means of a special device such as a bulldozer or a snow blower with turbine and freely directable hose. The snow may also be provided by an artificial snow generator.

In some cases, as shown on FIG. 2, line 6 and one of its tees 10 may be connected, not to a hose 11, but to a rigid discharging pipe 13, which is used for building up a remote snow heap 14; such a heap may form an intermediate store of snow, the distribution of which is ensured by a device 15 with front cutter and turbine, e.g. a turbine associated with a remote spraying nozzle 16. Such devices are used for desnowing thoroughfares.

When a larger store of snow is required at the inlet of line 6, an elongated heap 17 may be provided. Under such a heap 17 is placed a launder 18, inside which a conveying screw 19, with prime mover 20, can swivel. The edges of launder 18 are arranged as slides (or as races 18a for rollers) for carriage 21, bearing hopper 22 and powered oscillating screw 23, which thus sweeps each successive slice of the heap so as to bring the snow to hopper 22; the whole heap is then sliced by the successive advances of carriage 21.

The tip of the launder is a tubular element 24 connected to a snow injector (not shown) opening into the blowing duct of fan 2, duct 6 being placed either under the launder as shown, or otherwise.

The above-described arrangements allow efficient conveying and distribution of snow to any location, even very far from the storage point of natural snow or the manufacturing point of artificial snow, without high installation costs, since the latter involve no investment or reserve maintenance funds for silos or hoppers.

Besides, the snow heaps may be exploited otherwise than by the above-mentioned slicing method.

As shown on FIG. 5, on a slope bearing a ski run 31 and a teleski, for instance, a distributing line 33 approximately following the ski run is set up. The line may be laid on the ground, some portions at least, notably those crossing the run, being buried in a trench, and some overground portions at least being anchored with cables. Such a line may also be suspended overhead, e.g. from pylons with supporting arms.

A run is usually sloping; near the highest point is provided a fixed plant including an air generator 34, a compressed-air snow-feeding device 35 which sends the snow into line 33, and a collecting device 36 which may be connected either to a natural snow heap 37 or to an artificial snow manufacturing unit 38 with fan-gun.

On line 33 are of course provided a number of tees 39 for adapting a hose 42 (with suitable closers) and spraying snow onto bare patches.

Such an installation therefore includes a sloping line 33, inside which the force of gravity combines with the drive of compressed air, so as to convey snow with greater economy and safety.

As also shown on FIG. 5, to such an installation may be added, so as to improve its capacity, a mobile equipment including all the elements mentioned above as being placed at the head (highest point) of the line, carried on vehicle 40, and a hose 41, such a device making it possible to collect snow from heaps with different locations, and to spray snow onto run 31 at other points than those which can be treated with a spraying line 42 fitted on line 33.

As shown on FIG. 6, such a mobile equipment 40 and its hose 41 may be combined with the fixed elements 35 to 38, hose 41 then being directly fitted onto injecting device 35, while vehicle 40 makes it possible to collect snow from various natural sources without setting up a network of fixed installations near those sources.

As also shown on FIG. 6, the mobile equipment 40a or 40b, used inversely, may be fitted onto line 33 for lateral extension or lengthening of the said line, thus increasing the spraying range and making it possible to spray snow an a large area at the bottom of the run or on a neighbouring training run 43 with its own teleski 44.

As shown on FIGS. 7 and 8, the mobile equipment includes, on a full-track carrier 45 for instance, a cutter frame 46 fitted on the chassis of carrier 45 by means of lifting mechanism 47, driven by hydraulic jack 48. The cutter itself is driven by a power take-off on engine 50, mounted on the said frame, through universal-joint drive 49. The same engine can also drive, through drive 51, the mobile elements of lock 52 and of air generator 53, which sends air under slight overpressure (ca. 1 bar) into the conveying lines, the said generator being connected through adapter 55 with separator 56, which lets the snow through and stops foreign bodies such as stones and twigs. The separator is connected through hose 57 to snow collector 58, backed against cutter 46 under hood 59, which protects the rear end of the said cutter. Lock 52 is of course connected to standpipe 60 with elbow 61, to which may be connected, through adapter 62, a hose 63 for pneumatic conveying of snow. This hose may be wound, partly at least, on drum 64 carried by carrier 45. Standpipe 60 is meant to suspend the portion of line 63 near the carrier at a height leaving way for the latter, so that it cannot crush the hose when moving about.

As shown on FIG. 12, elbow 61 on standpipe 60 is a rigid and sturdy elbow, which can stand the weight and drag of hose 63; the elbow is fitted with airtight adapter 64, pivoting on standpipe 60.

As shown in the variation on FIG. 13, the elbow is shaped in a bent rigid launder carried by bracket 66 mounted on the frame of the carrier, upon which rests hose 63, the snap adapter of which may be at the foot of the bracket. In this variation, the flexibility of hose 63 is meant to make it possible to go without revolving adapter 64.

Rigid lines should preferably have an internal wall 67 with a low coefficient of friction for snow. This wall may be entirely made of flexible or rigid plastic or provided with a lining 68 made of a material such as iron or steel.

As shown on FIGS. 9 and 10, such a vehicle may be used as in a quarry, here on a natural heap of snow such as a snowfield or an avalanche field for instance, by bench runs, preferably along a circular course, as on snow layer 70a covering ground area 60. Vehicle 45 preferably runs along approximately circular benches, centered on sledge 69 on which hose 63 is anchored.

Hose length 63, which is dragged on the ground, may be provided at intervals with auxiliary skids 71, held on hose 63 by sleeves 71a, such skids having upturned ends.

Sledge 69 is connected by sleeves 72 with anchor pins 73, driven into the snow. It includes step bearing 74 in which swivels sleeve 75, made up by two hinged jaws surrounding line 63, and which forms the pivoting anchoring point of line 63.

Allowing for the reaction of the spray at the end of the spraying hose, the said hose is connected with monitor 70 (FIG. 15), mounted through a swivel pin in yoke 77 with pivot 78, carried in step bearing 79 on skid 80 wih anchor pins 81. The monitor may end with a flattened mouthpiece 82 and be provided with a positioning and steering device such as handle 83.

With such an arrangement, conveying of snow, helped by gravity, is made easier and cheaper.

On the other hand, associating a mobile equipment with the fixed elements on the terrain makes it possible to increase the range, both in the snow pickup area and in the area on which snow may be spread.

The working of the above arrangements is obvious and requires no further explanations.

Without exceeding the scope of the invention, changes may obviously be brought to the above-described embodiments.

What I claim is:

1. Apparatus for distributing snow from a storage area to a ski track comprising a motor assembly, a air lock manifold operated by said motor assembly and having a pair of inlets and an outlet, snow intake means operated by said motor assembly connected to one of said inlets for delivering snow to said manifold, an air blower operated by said motor assembly and connected to the other of said manifold inlets for ejecting said snow from said manifold outlet, an elongated main duct arranged at least in part to extend along the ground in association with said ski track, means connecting said main duct to said manifold outlet, a plurality of outlet mouths formed in said main duct, at least one secondary duct connected to selected ones of said outlet mouths of said main duct and extending away therefrom, a flexible distribution hose connected to said secondary duct, and a nozzle connected to said distribution hose, said nozzle being mounted on a movable support and having at least two degrees of freedom of movement.

2. The apparatus according to claim 1 wherein said movable support for said nozzle is a toboggan.

3. The apparatus according to claim 1 wherein said motor assembly, manifold, blower and snow intake are mounted on a supporting chassis.

4. The apparatus according to claim 3 wherein said chassis is mounted on a stationary post.

5. The apparatus according to claim 3 wherein said chassis is mounted on a movable vehicle.

6. The apparatus according to claim 1 including removable means for closing the outlet mouths of said main duct.

7. The apparatus according to claim 3 wherein said snow intake means comprises a snow plow carried between a pair of arms pivotally mounted at the front end of said vehicle, jack means for raising and lowering said snow plow, retractable duct means extending from said snow plow to said manifold inlet, and means connected to said motor assembly for operating said jack.

8. The apparatus according to claim 7 wherein said snow plow comprises a rotary snow cutter, arranged along a central shaft between said carrying arms, said carrying arms being mounted on a platform secured to said vehicle and being pivotal with respect thereto.

9. The apparatus according to claim 8 wherein said rotary snow plow comprises an auger formed in two axially aligned sections.

10. The apparatus according to claim 1, including means for movably supporting said main duct on said ground.

* * * * *